United States Patent [19]

Beim

[11] Patent Number: 5,295,924
[45] Date of Patent: Mar. 22, 1994

[54] MULTIPLE SPEED NONSYNCHRONOUS AUTOMATIC TRANSMISSION FOR MOTOR VEHICLES

[75] Inventor: Rudolf Beim, Southfield, Mich.
[73] Assignee: Ford Motor Company, Dearborn, Mich.
[21] Appl. No.: 986,239
[22] Filed: Dec. 7, 1992
[51] Int. Cl.$^5$ ............................................. F16H 3/62
[52] U.S. Cl. ................................. 475/275; 475/278
[58] Field of Search ............... 475/275, 278, 330, 337, 475/276

[56] References Cited

U.S. PATENT DOCUMENTS

| | | |
|---|---|---|
| 3,811,343 | 5/1974 | Mori et al. ............................ 475/285 |
| 3,835,732 | 9/1974 | Mori et al. ............................ 475/276 |
| 3,999,448 | 12/1976 | Murakami et al. .................. 475/276 |
| 4,007,648 | 2/1977 | Bookout ................................ 475/285 |
| 4,038,888 | 8/1977 | Murakami et al. .................. 475/276 |
| 4,086,827 | 5/1978 | Chana ................................... 475/281 |
| 4,089,238 | 5/1978 | Forester et al. ..................... 475/276 |
| 4,228,697 | 10/1980 | Miller ................................... 475/276 |
| 4,263,823 | 4/1981 | Numazawa et al. ................. 475/59 |
| 4,455,890 | 6/1984 | Kuramochi et al. ................. 475/59 |
| 4,509,389 | 4/1985 | Vahratian et al. ................... 475/66 |
| 4,653,347 | 3/1987 | Hiraiwa ................................ 475/66 |
| 4,653,348 | 3/1987 | Hiraiwa ................................ 475/276 |
| 4,660,439 | 4/1987 | Hiraiwa ................................ 475/276 |
| 4,702,125 | 10/1987 | Kalns ................................... 475/205 |
| 4,841,804 | 6/1989 | Miura et al. ......................... 475/66 |
| 4,884,471 | 12/1989 | Daggett et al. ..................... 475/285 |
| 4,939,955 | 7/1990 | Sugaro ................................. 475/278 |
| 4,963,124 | 10/1990 | Takahashi et al. .................. 475/278 |
| 4,978,328 | 12/1990 | Pierce .................................. 475/66 |
| 5,039,305 | 8/1991 | Pierce .................................. 475/71 |
| 5,087,232 | 2/1992 | Asada ................................... 475/278 |
| 5,098,357 | 3/1992 | Asada et al. ......................... 475/278 |
| 5,120,284 | 6/1992 | Asada et al. ......................... 475/278 |
| 5,129,871 | 7/1992 | Sandel et al. ........................ 475/297 |
| 5,167,592 | 12/1992 | Sakamoto ........................ 475/275 X |

FOREIGN PATENT DOCUMENTS

| | | |
|---|---|---|
| 52-52067 | 4/1977 | Japan . |
| 59-231245 | 12/1984 | Japan . |
| 64-35147 | 2/1989 | Japan . |
| 3-194242 | 8/1991 | Japan ................................. 475/278 |

Primary Examiner—Leslie A Braun
Assistant Examiner—Khoi Ta
Attorney, Agent, or Firm—Frank G. McKenzie; Roger L. May

[57] ABSTRACT

A multiple speed ratio transmission for use in the driveline of an automotive vehicle includes a hydrokinetic torque converter and three interconnected planetary gear units, several one-way clutches and brakes, friction clutches and friction brakes. The engaged and release state of the friction elements permits the transmission to produce several underdrive speed ratios, a direct drive ratio, an overdrive ratio and reverse drive.

11 Claims, 1 Drawing Sheet

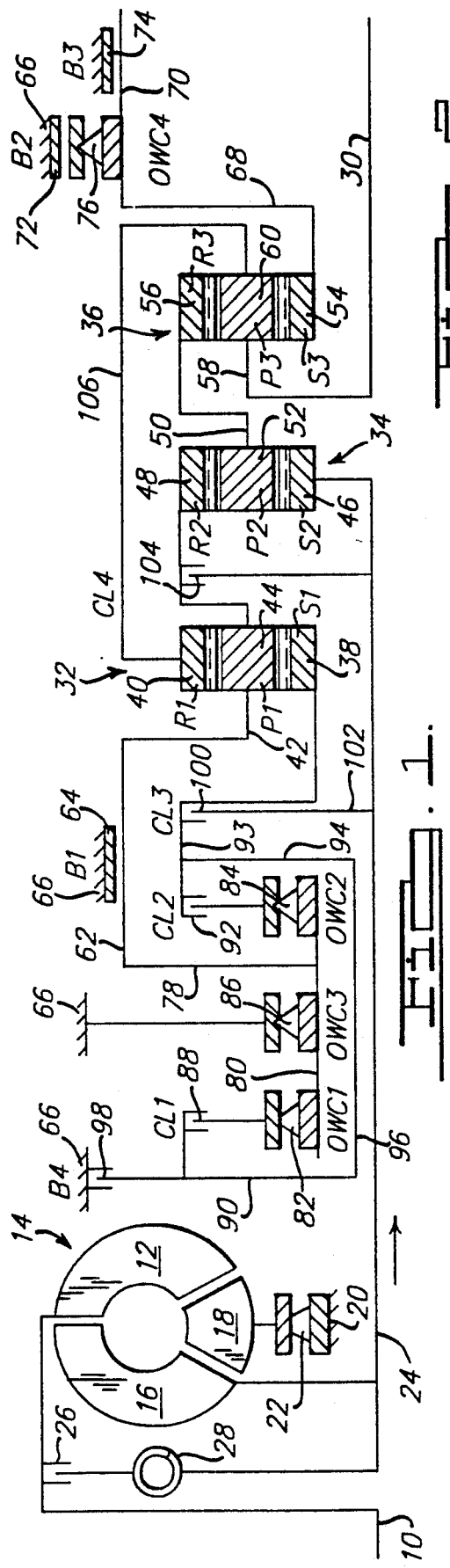

MULTIPLE SPEED NONSYNCHRONOUS AUTOMATIC TRANSMISSION FOR MOTOR VEHICLES

BACKGROUND OF THE INVENTION

1. Field of the Invention

This invention relates to planetary gearing and associated clutches, brakes and overrunning couplings that control operation of the gearing to produce several forward drive ratios and a reverse drive ratio. The invention pertains particularly to the arrangement of clutches, brakes and couplings and their mutual interconnection and connection with the elements of the gearing.

2. Description of the Prior Art

This invention includes improvements in a four speed ratio power transmission mechanism of the kind described in U.S. Pat. Nos. 4,509,389; 4,368,649, and U.S. Ser. No. 07/878,353 filed May 4, 1992. These patents and application are assigned to the assignee of this invention.

U.S. Pat. No. 4,509,389 discloses a hydrokinetic torque converter located on the axis of the crankshaft of an internal combustion engine and two simple planetary gear units mounted for rotation about the axis of a driven shaft, which extends parallel to the crankshaft axis and concentrically through the gearing. The torque output element of the torque converter, which is the turbine shaft of the bladed turbine, is connected driveably to the gearing by to a drive sprocket and a chain. Clutches and brakes are used to establish and disestablish four forward driving ratios as well as a reverse drive ratio.

A first overrunning coupling and a first friction clutch are used to establish a driving connection between an input sun gear of the gearing and the driven sprocket. A second overrunning coupling and a second friction clutch located in series relationship connect the sun gear to the driven sprocket. The first friction clutch and the second friction clutch each are provided with fluid pressure operated servos that comprise an annular cylinder and a cooperating annular piston, which define pressure chambers that rotate about the axis of the gearing. When the chambers are pressurized, the pistons engage friction discs to establish a driving connection between the outer race of the companion overrunning coupling and the common rotary portions of the clutch cylinders.

U.S. Pat. No. 3,054,488 describes an overrunning coupling that is engaged and released selectively to accommodate free-wheeling in either direction and to prevent relative rotation between the coupling races in one direction. Rollers are urged into clutching engagement with inner and outer races or into a clutch release position by fluid pressure.

SUMMARY OF THE INVENTION

It is an object of this invention to provide a transmission that automatically produces nonsynchronous gear ratio change in an automotive vehicle wherein the gear and clutch arrangement requires a minimum number of friction elements and one-way couplings. An advantage of this invention is that the arrangement minimizes the torque capacity required for the various friction elements that control operation of the gear units. A second advantage is that jump gear ratio changes, such as the 5-3, 4-2 and 3-1 downshifts, are also made nonsynchronously.

In realizing these objectives and advantages the transmission employs multiple torque delivery paths arranged in parallel and located between the sun gear and carrier of a first gear unit so that the elements of the first gear unit turn at the same speed and in the same direction during operation in the second and fourth speed ratios. The transmission further include multiple brakes arranged in series relationship and located in the torque delivery path between the transmission casing and the carrier of the first gear unit so that the carrier is held against rotation in the reverse drive condition and during operation in the first speed ratio. Another parallel brake arrangement is located between the transmission casing and the sun gear of a third gear unit, one of the parallel brake paths including an overrunning coupling and brake band, the other brake path including only an overrunning coupling operable in coast conditions to provide engine braking.

The input shaft of the transmission is continually connected to the sun gear of the second gear unit and is selectively connected through a friction clutch to the ring gear of the second gear unit and the carrier of the first gear unit. The ring gear of the first gear unit is continually connected to the carrier of the third gear unit and to the output shaft. The sun gear of the first gear unit is selectively coupled to the input shaft through a friction clutch, and the carrier of the second gear unit is continually connected to the ring gear of the third gear unit.

BRIEF DESCRIPTION OF THE DRAWINGS

FIG. 1 is a schematic diagram showing an arrangement of planetary gear units, clutches and brakes according to this invention.

FIG. 2 is a chart that shows the schedule of engagement and release of the clutches and brakes that establish the various forward and reverse drive ratios of the mechanism of FIG. 1.

DESCRIPTION OF THE PREFERRED EMBODIMENT

In FIG. 1, the crankshaft 10 of an internal combustion engine (not shown) is driveably connected to impeller 12 of an hydrokinetic torque converter 13. A bladed turbine 16 and a bladed stator 18 together with the impeller define a toroidal fluid flow circuit. The stator 18 is supported on a stationary stator shaft 20, and an overrunning brake 22 fixes the stator to shaft 20 to prevent stator rotation in a direction opposite the direction of rotation of the impeller, although free-wheeling motion in the opposite direction is permitted.

Turbine 16 is driveably connected to the turbine input shaft 24. The converter assembly includes a lockup clutch 26, located within the torque converter impeller housing. The torque output side of the lockup clutch includes adapter 28 located between the impeller and input shaft 24 so that engagement of the lockup clutch will not be accompanied by harshness due to transient torque conditions. Lockup clutch 26 produces a releaseable mechanical drive connection between the input shaft 24 and crankshaft 10.

An arrangement of gearing, clutches, and brakes is located in a torque delivery path between input shaft 24 and output shaft 30. The gearing includes first, second and third simple planetary gear units 32, 34, 36. The first gear unit includes a sun gear 38, ring gear 40, carrier 42 and set of planetary pinions 44 rotatably supported on carrier 42 and in continual meshing engagement with the sun gear and ring gear. The second gear unit includes sun gear 46, ring gear 48, carrier 50 and a set of planetary pinions 52 rotatably supported on carrier 50 and continually meshing with sun gear 46 and ring gear 48. The third gear unit includes sun gear 54, ring gear 56, carrier 58 and a set of planetary pinions 60 rotatably supported on carrier 58 and continually meshing with sun gear 54 and ring gear 56.

Input shaft 24 is driveably connected to sun gear 46; carrier 58 is driveably connected to output shaft 30. Carrier 50 of the second gear unit is driveably connected to ring gear 56 of the third gear unit. Ring gear 40 of the first gear unit is driveably connected to carrier 58 of the third gear unit. Carrier 42 of the first gear unit is driveably connected to ring gear 48 of the second gear unit and to brake drum 62, which is engaged and held against rotation on the transmission housing 66 by a first brake 64.

Sun gear 54 of the third gear unit is driveably connected by transmission element 68 to a second brake drum 70, which is releaseably engaged and held against rotation by a second brake set 72 and a third brake 74. A one-way clutch 76 located in the torque delivery path between brake drum 70 and brake band 72, produces a one-way drive connection between the transmission housing 66 when brake 72 is applied.

Brakes 64, 72, 74 are preferably actuated by hydraulic servos supplied with pressurized hydraulic fluid through operation of a pressure control system in a hydraulic circuit and released by venting the servos. The various speed ratios of the transmission are produced in accordance with electronic signals that control operation of solenoid operated hydraulic valves or pressure signals that direct pressure to the servos in accordance with a gearshift schedule that defines a range of operation for each gear ratio in terms of vehicle speed and engine throttle position.

Brake drum 62 is connected by transmission element 78 to a drum 80 that rotatably supports the inner races of a first one-way clutch 82, second one-way clutch 84 and third one-way clutch 86.

One-way coupling 82 produces a one-way drive connection between drum 80 and an element of a first friction clutch 88, which connects and releases the outer race of coupling 82 and transmission element 90. Second overrunning coupling 84 produces a one-way drive connection between a second friction element 92, which connects and release the outer race of coupling 84 and element 93. Overrunning coupling 86 produces a one-way drive connection between drum 80 and the transmission housing 66.

Element 93 is connected by element 94, sleeve shaft 96 and element 90 to a friction brake 98, which connects and releases element 90 and the transmission housing 66.

A third hydraulically actuated friction clutch 100 driveably connects and releases element 93 and input shaft 24 in accordance with the pressurized state of clutch 100.

A fourth hydraulically actuated friction clutch 104 engages and releases a driveable connection among carrier 42 of the first gear unit; ring gear 48 of the second gear unit, to which the carrier 42 is continually connected; and input shaft 24.

The operator of the vehicle controls a transmission gear selector that is moveable among several ranges including a drive range, in which five forward speed ratios are automatically produced, a reverse range and three manual ranges M1, M2, M3 in which the lowest gear ratios up to and including the ratio corresponding to the number of the manual range are produced automatically. The chart of FIG. 2 shows the engaged and released states of the clutches, brakes and couplings that produce the forward and reverse gear ratios of the transmission.

In the drive range, first speed ratio is produced when brake 72 is applied. Its engagement causes coupling 76 to driveably connect sun gear 54 and brake drum 70 to the transmission casing through operation of coupling 76 and brake 72. Also, coupling 86 driveably connects carrier 42 and ring gear 48 to the transmission housing through brake drum 62, element 78 and drum 80. Sun gear 46 is driveably connected through the torque converter 14 to crankshaft 10. Ring gear 48 is held; ring gear 56 is driven by carrier 50, the output of the second gear unit; sun gear 54 is held; and output shaft 30 is driven by carrier 58.

During a coast condition in the first gear ratio, couplings 76 and 86 overrun. There is no gear set reaction and engine braking does not result.

An upshift to the second gear ratio occurs when clutch 88 is engaged while maintaining brake 72 engaged. This action causes couplings 76 and 82 to transmit torque during a drive condition and to overrun during a coast condition. In this way, carrier 42 and sun gear 38 are mutually connected, thereby locking up the first gear unit 32, which rotates at the speed of output shaft 30 and drives ring gear 48 at the same speed. The magnitude of torque transmitted through clutch 88 is comparatively low. Sun gear 46 is driven by input shaft 24, the gear set reaction is provided at sun gear 54, which is held through operation of coupling 76 and brake 72 on transmission casing 66. During a coast condition, couplings 76, 82 and 86 overrun; therefore, the first gear unit is not locked up and sun gear 54 is not held against rotation. In this condition, there is no engine braking available. Coupling 86 overruns also in drive conditions.

To produce an upshift to third gear from the second speed ratio, clutch 104 is additionally engaged, causing couplings 82 and 86 to overrun and coupling 76 to hold sun gear 54 against rotation on the transmission housing through operation of brake 72. The first gear unit is not locked up because coupling 82 overruns, but the second gear unit is locked up because both sun gear 46 and ring gear 48 are driveably connected to the input shaft. The gear set reaction is provided at sun gear 54, ring gear 56 is driven at the speed of input shaft 24 and the output is taken on carrier 58. During a coast condition in the third speed ratio, coupling 76 overruns, thereby eliminating the gear set reaction. There is no engine braking. Coupling 82 and 86 overrun in drive and coast conditions, coupling 76 transmits torque in drive conditions.

To upshift from the third speed ratio to fourth speed ratio, clutch 92 is engaged in addition to the clutches and brakes engaged during operation in the third speed ratio. When clutch 92 is engaged, coupling 84 driveably connects sun gear 38 and carrier 42, thereby locking up the first gear unit 32 and driving output shaft 30 at the speed of input shaft 24. Input shaft 24 drives sun gear 46. Clutch 104 driveably connects the input shaft to ring gear 48, thereby locking up the second gear unit and driving ring gear 56 at the speed of input shaft 24. However, carrier 58 is also rotating at the speed of the input shaft due to its connection through transmission elements 106 to ring gear 40; therefore, the third gear unit is likewise locked up so that a direct drive connection exists between the input shaft and the output shaft. During a coast condition in the fourth speed ratio, couplings 76, 84 and 86 overrun and coupling 82 is inactive. There is no gearset reaction and no engine braking. Couplings 76 and 86 overrun in drive and coast conditions; coupling 84 transmits torque in drive conditions.

To produce an upshift from the fourth speed ratio to the fifth ratio, clutch 88 is disengaged, brake 98 is applied, clutches 92 and 104 remain applied and brake 72 remains applied. With the hydraulically actuated friction elements in that condition, couplings 76, 84 and 86 overrun in the drive and coast conditions and coupling 82 is inactive in drive and coast conditions. The upshift from fourth speed ratio to the fifth speed ratio is nevertheless a nonsynchronous upshift as are the other gear ratio changes. Because clutch 88 is unloaded in the fourth speed ratio, it can be released at any time before or after an upshift to fourth gear ratio occurs without its disengagement having to be synchronized with engagement of the oncoming friction element, brake 98.

During a drive condition in the fifth speed ratio, sun gear 38 is held against rotation through operation of brake 98, and carrier 42 is driven by the input shaft through operation of clutch 104. The output is taken at carrier 58, which is driven by ring gear 40 through element 106. Sun gear 46 and ring gear 48 of the second gear unit are driven by input shaft 24, and carrier 50 drives ring gear 56 at the speed of the input shaft. During a coast condition in the fifth speed ratio, ring gear 40 is driven by output shaft 30, sun gear 38 is held against rotation by reason of the engagement of brake 98, and input shaft 24 is driven from carrier 42 through clutch 104. Engine braking is available.

The reverse drive condition results when clutch 100 and brake 64 are applied and the other hydraulically actuated friction elements are disengaged. This action drives sun gear 38 of the first gear unit through clutch 100, holds carrier 42 fixed against rotation through operation of brake 64, and drives ring gear 40, carrier 58 and output shaft 30 in the opposite direction from that of input shaft 24 and at a lower speed. Engine braking is available during a coast condition in reverse drive.

When the gear selector lever is moved by the vehicle operator to the M1 range, brakes 64, 72 and 74 are engaged, the clutches and brake 98 are disengaged, and all couplings are inactive. This action holds ring gear 48 against rotation on the transmission housing through operation of brake 64, and sun gear 54 is fixed against rotation by brake 74. Sun gear 46 is driven by input shaft 24, the output of the second gear unit. Carrier 50 drives ring gear 56, and carrier 58 drives output shaft 30. The gear set reactions at sun gear 54 and ring gear 48 are continually present in the coast condition, thereby providing engine braking.

When the gear shift lever is moved to the M2 range, clutches 88 and 92 are engaged, brakes 72 and 74 are engaged. Coupling 82 and clutch 88 driveably connect drum 80 and sungear 38 during a drive condition, but it overruns during a coast condition. Coupling 84 driveably connects drum 80 and sun gear 38 during a coast Condition, but it overruns during a drive condition. Therefore the first gear unit 32 is locked-up during drive and coast conditions, and carrier 42 and sun gear 38 of the first gear unit turn at the same speed and in the same direction in drive and coast conditions in the M2 range. Consequently, ring gears 40 and 48, element 106, carrier 58 and output shaft 30 turn in the same direction and at the same speed as the clutched elements of the first gear unit, sun gear 38 and carrier 42. The gear set reaction is present in drive and coast conditions at sun gear 54, which is held against rotation on the transmission housing by brake 74. During drive conditions in the M2 range, sun gear 46 is driven by input shaft 24. The gear set reaction is at sun gear 54 and the output is taken at carrier 58. During coast conditions in the M2 range, output shaft 30 drives carrier 58, sun gear 54 is held against rotation, and sun gear 54 drives input shaft 24. Engine braking is available.

When the gear selector is moved by vehicle operator to the M3 range, hydraulically actuated friction clutches 88, 104 and brakes 72, 74 are engaged. The other friction elements of the transmission and all of the one-way couplings are inactive, i.e., they transmit no torque. The gear set reaction is provided at sun gear 54 in drive and coast conditions through operation of brake 74. Sun gear 46 and ring gear 48 turn at the speed and in the same direction as input shaft 24, thereby locking-up the second gear unit 34 and driving ring gear 56 of the third gear unit at the same speed as the input shaft. In drive conditions, the input is taken on carrier 58 and output shaft 30. During coast conditions, output shaft 30 drives carrier 58. Ring gear 56 drives carrier 50, and sun gear 46 and ring gear 48 drive input shaft 24.

I claim:
1. A multiple speed ratio automatic transmission, comprising:
   an input shaft adapted to be driven by an engine and an output shaft;
   first, second and third gear units, each gear unit having a sun gear, ring gear, planet pinions meshing with the sun gear and ring gear, and carrier rotatably supporting the planet pinions;
   the sun gear of the second gear unit constantly driveably connected to the input shaft, the carrier of the second gear unit driveably connected to the ring gear of the third gear unit, the carrier of the first gear unit constantly driveably connected to the ring gear of the second gear unit, the ring gear of the first gear unit and carrier of the third gear unit driveably connected to the output shaft;
   first brake means (72, 76 and 74) for releasably holding the sun gear of the third gear unit against rotation;
   a first clutch (104) for releasably connecting the ring gear of the second gear unit and the carrier of the first gear unit to the input shaft;
   a second clutch (100) for releasably connecting the input shaft and sun gear of the first gear unit;
   clutch means (88, 82 and 92, 84) for releasably connecting the sun gear of the first gear unit and carrier of the first gear unit;
   second brake means (64 and 86, 66) for releasably holding the carrier of the first gear unit against rotation; and
   third brake means (98) for releasably holding the sun gear of the first gear unit against rotation.

2. The transmission of claim 1 wherein the first brake means comprises:
   a first coupling means (76) for producing a one way drive connection of the sun gear of the third gear unit and an element of said first coupling means; and
   first friction brake means (72) for releasably holding said element against rotation.

3. The transmission of claim 1 wherein the first brake means comprises a second friction brake means (74) for releasably holding the sun gear of the third gear unit against rotation.

4. The transmission of claim 1 wherein first brake means comprises:
   a first coupling means (76) for producing a one-way drive connection of the sun gear of the third gear unit and an element of said first coupling means;
   first friction brake means (72) for releasably holding said element against rotation; and
   a second friction brake means (74) arranged in parallel with the first coupling means and first friction brake means for releasably holding the sun gear of the third gear unit against rotation.

5. The transmission of claim 1 wherein second brake means comprises a third friction brake means (64) for releasably holding the carrier of the first gear unit against rotation.

6. The transmission of claim 1 wherein second brake means comprises a second coupling means (86) for producing a one-way drive connection of the carrier of the first gear unit and a nonrotating element.

7. The transmission of claim 1 wherein second brake means comprises a third friction brake means (64) for releasably holding the carrier of the first gear unit against rotation; and a second coupling means (86) arranged in series with the third friction brake means between a nonrotating element and the carrier of the first gear unit for producing a one-way drive connection of the carrier of the first gear unit and said nonrotating element.

8. The transmission of claim 1 wherein the clutch means comprises:
   third coupling means (82) for producing a one-way drive connection of the carrier of the first gear unit and an element of said third coupling means; and
   first friction clutch means (88) for releasably connecting the sun gear of the first gear unit and said element of said third coupling means.

9. The transmission of claim 1 wherein the clutch means comprises:
   fourth coupling means (84) for producing a one-way drive connection of the carrier of the first gear unit and an element of said fourth coupling means; and
   second friction clutch means (92) for releasably connecting the sun gear of the first gear unit and said element of said third coupling means.

10. The transmission of claim 1 wherein the clutch means comprises:
    third coupling means (82) for producing a one-way drive connection of the carrier of the first gear unit and an element of said third coupling means;
    first friction clutch means (88) for releasably connecting the sun gear of the first gear unit and said element of said third coupling means;
    fourth coupling means (84) for producing a one-way drive connection of the carrier of the first gear unit and an element of said fourth coupling means; and
    second friction clutch means (92) for releasably connecting the sun gear of the first gear unit and said element of said third coupling means, the second friction clutch means and fourth coupling means arranged in parallel with the third coupling means and first friction clutch means between the sun gear of the first gear unit and the carrier of the first gear unit.

11. A multiple speed ratio automatic transmission, comprising:
    an input shaft adapted to be driven by an engine and an output shaft;
    first, second and third gear units, each gear unit having a sun gear, ring gear, planet pinions meshing with the sun gear and ring gear, and carrier rotatably supporting the planet pinions;
    the sun gear of the second gear unit constantly driveably connected to the input shaft, the carrier of the second gear unit driveably connected to the ring gear of the third gear unit, the carrier of the first gear unit constantly driveably connected to the ring gear of the second gear unit, the ring gear of the first gear unit and carrier of the third gear unit driveably connected to the output shaft;
    first brake means (72,76 and 74) for releasably holding the sun gear of the third gear unit against rotation, comprising
       a first coupling means (76) for producing a one-way drive connection of the sun gear of the third gear unit and an element of said first coupling means;
       first friction brake means (72) for releasably holding said element against rotation; and
       a second friction brake means (74) arranged in parallel with the first coupling means and first friction brake means for releasably holding the sun gear of the third gear unit against rotation;
    a first clutch (104) for releasably connecting the ring gear of the second gear unit and the carrier of the first gear unit to the input shaft;
    a second clutch (100) for releasably connecting the input shaft and sun gear of the first gear unit;
    clutch means (88,82 and 92,84) for releasably connecting the sun gear of the first gear unit and carrier of the first gear unit, comprising
       third coupling means (82) for producing a one-way drive connection of the carrier of the first gear unit and an element of said third coupling means;
       first friction clutch means (88) for releasably connecting the sun gear of the first gear unit and said element of said third coupling means;
       fourth coupling means (84) for producing a one-way drive connection of the carrier of the first gear unit and an element of said fourth coupling means; and
       second friction clutch means (92) for releasably connecting the sun gear of the first gear unit and said element of said third coupling means, the second friction clutch means and fourth coupling means arranged in parallel with the third coupling means and first friction clutch means between the sun gear of the first gear unit and the carrier of the first gear unit;
    second brake means (64 and 86) for releasably holding the carrier of the first gear unit against rotation, comprising third friction brake means (64) for releasably holding the carrier of the first gear unit against rotation; and second coupling means (86) arranged in series with the third friction brake means between a nonrotating element and the carrier of the first gear unit for producing a one-way drive connection of the carrier of the first gear unit and said nonrotating element; and
    third brake means (98) for releasably holding the sun gear of the first gear unit against rotation.

* * * * *